(12) United States Patent
Chen

(10) Patent No.: US 8,568,498 B2
(45) Date of Patent: Oct. 29, 2013

(54) METHOD FOR PREPARING A GRINDING COMPOSITION

(71) Applicant: Aurora Office Equipment Co., Ltd. Shanghai, Shanghai (CN)

(72) Inventor: Hsin-Hsiung Chen, Shanghai (CN)

(73) Assignee: Aurora Office Equipment Co., Ltd Shanghai (CN)

( * ) Notice: Subject to any disclaimer, the term of this patent is extended or adjusted under 35 U.S.C. 154(b) by 0 days.

(21) Appl. No.: 13/862,106

(22) Filed: Apr. 12, 2013

(65) Prior Publication Data

US 2013/0227893 A1 Sep. 5, 2013

Related U.S. Application Data

(63) Continuation of application No. 12/837,377, filed on Jul. 15, 2010.

(51) Int. Cl.
 *B65D 85/00* (2006.01)
 *B65D 73/00* (2006.01)
 *C09K 3/14* (2006.01)

(52) U.S. Cl.
 USPC ............. 51/294; 51/304; 51/305; 206/484; 451/533; 451/559

(58) Field of Classification Search
 USPC ......... 51/304, 305, 307, 294; 206/484, 484.1, 206/484.2, 525; 451/526, 559, 533
 See application file for complete search history.

(56) References Cited

U.S. PATENT DOCUMENTS

| | | | | |
|---|---|---|---|---|
| 2,828,261 A | * | 3/1958 | Veatch et al. | 508/136 |
| 4,537,604 A | * | 8/1985 | Dawson | 51/298 |
| 4,891,265 A | * | 1/1990 | Samagalsky | 428/74 |
| 5,279,755 A | * | 1/1994 | Choy et al. | 510/369 |
| 6,048,677 A | * | 4/2000 | Chen et al. | 430/527 |
| 6,419,174 B1 | * | 7/2002 | McGill et al. | 427/249.1 |
| 6,634,576 B2 | * | 10/2003 | Verhoff et al. | 241/21 |
| 7,166,561 B2 | * | 1/2007 | Allen | 508/100 |
| 7,387,270 B2 | * | 6/2008 | Wang | 241/301 |
| D601,434 S | * | 10/2009 | Zhu | D9/707 |
| 7,793,876 B2 | * | 9/2010 | Wang | 241/301 |
| 7,902,129 B2 | * | 3/2011 | Allen | 508/110 |
| 8,109,455 B2 | * | 2/2012 | Allen | 241/38 |

(Continued)

OTHER PUBLICATIONS

Karis, T. E., Nonlinear Rheology for a Grease, J. Ind. Eng. Chem., vol. 9, No. 4, (2003) 419-425.

(Continued)

*Primary Examiner* — Timothy V Eley
(74) *Attorney, Agent, or Firm* — WHGC, PLC; John F. O'Rourke

(57) ABSTRACT

Composition, apparatus, and methods of composition and apparatus manufacture, for sharpening a paper shredder blade. Composition includes grinding powder, thickening agent, and additive. The thickening agent may be a white oil, an animal oil, a vegetable oil, or a stearine wax. The additive may be an antirust powder, an antiwear powder, an antistatic powder, or an antioxidation powder. The grinding composition is dispensed into a polyethylene film, and sealed to form the grinding apparatus, as a grinding sheet or a grinding packet. A method for forming a grinding sheet includes selecting the constituent materials for a grinding composition; stirring the constituent grinding composition materials; heating the constituent materials to melting; mixing the constituent materials, while melting and intermixing; cooling and packaging the grinding composition to form a grinding sheet or packet.

3 Claims, 3 Drawing Sheets

(56) References Cited

U.S. PATENT DOCUMENTS

| | | | |
|---|---|---|---|
| 8,167,224 B2* | 5/2012 | Allen | 241/36 |
| 2006/0169619 A1* | 8/2006 | Wang | 206/484 |
| 2006/0243631 A1* | 11/2006 | Duke | 206/525 |
| 2007/0080252 A1* | 4/2007 | Pierce et al. | 241/236 |
| 2009/0032006 A1* | 2/2009 | Nam et al. | 125/16.02 |
| 2009/0111359 A1* | 4/2009 | Suzuki et al. | 451/36 |
| 2009/0264050 A1* | 10/2009 | Upadhyay et al. | 451/28 |
| 2010/0267599 A1* | 10/2010 | Lucka et al. | 510/139 |
| 2011/0059683 A1* | 3/2011 | Suzuki et al. | 451/41 |
| 2011/0171890 A1* | 7/2011 | Nakayama et al. | 451/526 |

OTHER PUBLICATIONS

Galanty, H. E., Size Reduction Paradox, Franklin Miller, Inc.

Palaniandy, S., et al., Custom Made Micronized Silica for Paint Industry Via Fine Grinding Process, Adv. in Tech. of Mat. and Mat. Proc. J. (ATM, ISSN 1440-0731), vol. 8 [1].

Jyoti Ceramic Industries PVT, LTD., Steatite: Ceramic Mill Lining Blocks and Grinding Media, Steatite (HF-82).

* cited by examiner

METHOD FOR PREPARING A GRINDING COMPOSITION

CROSS-REFERENCE TO RELATED APPLICATIONS

This patent application is a continuation of and claims benefit to copending application Serial No. 12/837,377, filed Jul. 15, 2010, entitled "APPARATUS AND COMPOSITION FOR SHARPENING A PAPER SHREDDER BLADE, AND PREPARATION PROCESS THEREFOR," assigned to the same Assignee hereof, and to application, filed on Apr. 12, 2013, and entitled "APPARATUS AND COMPOSITION FOR SHARPENING A PAPER SHREDDER BLADE, AND PREPARATION PROCESS THEREFOR," assigned to the same Assignee hereof, which both are incorporated herein in their entirety. The aforementioned applications claim priority to China Application, Ser. No. 200910056439.5, filed Aug. 14, 2009.

BACKGROUND OF THE INVENTION

1. Technical Field

The present invention relates to the technical field of paper shredders, and in particular, the paper shredder maintenance.

2. Background Art

The main element of a current paper shredder is a paper shredder core wherein two sets of paper shredder blades are mounted. The two sets are rotated in opposite directions when shredding papers. Under cooperation of the two sets of paper shredder blades, paper to be shredded is destroyed when sent into the paper shredder. However, the paper shredder blades will lose sharpness over time, which reduces the shredding effect and may lead to paper shredder malfunctions, such as paper jams. In extreme cases, the shredder blades will be damaged, degrading the normal shredder operation, and even causing paper shredder breakdown.

A conventional method to solve the above problem is to disassemble the paper shredder, to take down the blades of the paper shredder blade sets, to grind the blade sets for resharpening, and then to reassemble the paper shredder. However, this method interrupts shredder use and may take significant time and effort. Another method is to directly change the sets of paper shredder blades, which takes less time than the preceding method, but increases the maintenance cost. This alternative method is still troublesome, because the paper shredder is typically disassembled during maintenance. Many end users will not, or do not wish to, disassemble a shredder for repair; as a result, many such users come to accept declining shredder performance over time.

It is desirable, then, to provide a grinding composition and apparatus for sharpening a paper shredder blade, as well as a preparation process therefore, suitable to resolve the aforementioned problems.

SUMMARY OF THE INVENTION

Described herein are example embodiments of grinding compositions for sharpening a blade of a paper shredder, grinding apparatus that can include the grinding composition, methods for preparing embodiments of the grinding composition, and methods for preparing embodiments of the grinding apparatus.

In embodiments of a grinding composition for sharpening a blade of a paper shredder, there can be included a selected grinding powder in a concentration of between about 51% w/w to about 65% w/w, a selected thickening agent in a concentration of between about 5% w/w to about 35% w/w, and a selected additive in a concentration of between about 3% w/w to about 30% w/w. The selected grinding power can have a particle size of between about 0.1 microns to about 40 microns.

The selected thickening agent can be one or more of a white oil, a animal oil, an vegetable oil, or a stearine wax. The additive can be selected from one or more of an antirust powder, an antiwear powder, an antistatic powder, or an antioxidation powder. An antirust powder additive can be a stearate powder, such as aluminum distearate. An antiwear powder additive can be a microcrystalline wax, or a complex sodium-calcium based soap grease powder. An antistatic powder additive can be a glycerol monostearate powder An antioxidation powder additive can be a dibutyl-hydroxytoluene (butylated hydroxytoluene) powder.

First example embodiments of the grinding composition may have a selected grinding powder concentration of about 55% w/w, the selected thickening agent concentration of about 35% w/w, a selected antirust powder additive concentration of about 5% w/w, a selected antiwear powder additive concentration of about 2% w/w, a selected antistatic powder additive concentration of about 2% w/w, and a selected antioxidation powder additive concentration of about 1%w/w. First example embodiments can have one of a white oil or a vegetable oil as a thickening agent.

Also, second example embodiments of the grinding composition can have a selected grinding powder concentration of about 57% w/w, a selected thickening agent can have a concentration is about 35% w/w, a selected antirust powder additive can have a concentration of about 5% w/w, a selected antistatic powder additive can have a concentration of about 2% w/w, and a selected antioxidation powder additive can have a concentration of about 1% w/w. Second example embodiments may employ a stearine wax as a thickening agent. Also, second example embodiments can use a natural mineral grinding powder as a selected grinding powder, aluminum distearate powder as a selected antirust powder additive, glycerol monostearate powder as a selected antistatic powder additive, dibutyl-hydroxytoluene powder as a selected antioxidation powder additive, and one of a microcrystalline wax or a complex sodium-calcium based soap grease powder as a selected antiwear powder additive. In addition, the stearine wax can be prepared by combining stearic acid with one or more of a white wax, a microcrystalline wax, and a polyethylene wax. Moreover, in some of the second example embodiments, the stearic acid can be prepared from an animal fat and a vegetable fat.

In addition, in selected embodiments where the selected grinding powder is natural mineral grinding powder, the selected grinding powder can be one of a grinding powder of natural diamond, or a grinding and polishing powder of natural micron quartz.

In first example embodiments of the grinding apparatus, the apparatus can include a selected grinding powder constituent in a concentration of between about 51% w/w to about 65% w/w, a selected thickening agent constituent in a concentration of between about 5% w/w to about 35% w/w, and a selected additive constituent in a concentration of between about 3% w/w to about 30% w/w. First example embodiments can be formed into a grinding sheet, so that the grinding sheet is shredded by the blade of the paper shredder, so that the shredder blade can be sharpened by shredding the grinding sheet.

In a first example embodiment for preparing a grinding apparatus, a process includes selecting a selected grinding powder constituent in a concentration of between about 51% w/w to about 65% w/w, selecting a selected thickening agent constituent in a concentration of between about 5% w/w to about 35% w/w, and selecting a selected additive constituent in a concentration of between about 3% w/w to about 30% w/w. As with previous embodiments the selected grinding powder may be between about 0.1 micron to about 40 microns. In certain selected embodiments, the selected thickening agent can be a stearine wax. The process can continue by stirring the constituents, melting the constituents, and intermixing the constituents until homogenized into a grinding composition. After the grinding composition is formed, the process can continue by cooling the grinding composition; and packaging the grinding composition into a preselected form. The preselected form can be one of a grinding sheet or a grinding packet.

In an example embodiment in which the preselected form can be a sheet, the process embodiment also can continue by compressing the grinding composition into a grinding sheet, and, in some grinding sheet embodiments, also can include cutting the compressed grinding composition into sheets having one or more of a preselected width, a preselected length, and a preselected thickness. Alternatively, in another example embodiment in which the preselected form can be a packet, the process embodiment can continue by depositing the grinding composition into a plastic bag, and sealing the plastic bag.

In yet another example embodiment in which the preselected form can be a packet, the process can include premeasuring a volumetric bolus of the grinding, and enwrapping the volumetric bolus in a portion of a wrapper. The wrapper may be a plastic bag or a portion of a plastic sheet. Furthermore, sealing the plastic around the volumetric bolus can form a sealed grinding packet. The plastic bag or the portion of a plastic sheet can be made of polypropylene.

In some embodiments of a process for making a grinding apparatus, prior to enwrapping, the grinding composition into a preselected form, the process for making a grinding apparatus can include imposing an image on one of the roll of plastic film or the plastic bag. The image can be one of a character, a picture, or a symbol. In alternative embodiments, imposing the image can be implemented by imposing the image by single color printing or imposing the image by chromatography.

BRIEF DESCRIPTION OF THE DRAWINGS

Embodiment of the present invention disclosed herein are illustrated by way of example, and are not limited by the accompanying figures, in which like references indicate similar elements, and in which.

Figure 1:
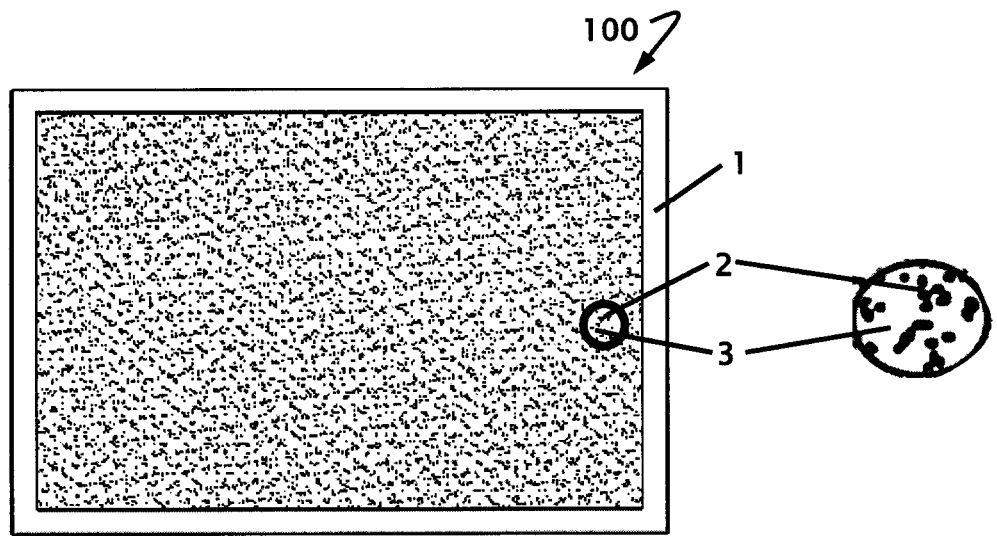
FIG. 1 is an exploded perspective view of a grinding apparatus for sharpening a paper shredder blade, in accordance with the teachings of the present invention.

Skilled artisans can appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DESCRIPTION OF THE EMBODIMENTS

The embodiments herein provide examples of apparatus, compositions, and processes for preparing the compositions, that can be used to sharpen the blades of a paper shredder and that can be prepared in a straightforward manner using widely available raw materials, in light of the teachings herein. The apparatus may be, without limitation, in the form a grinding sheet or a grinding packet: (1) which can contain an embodiment of a grinding composition described herein; (2) which can grind and sharpen the paper shredder blades safely and effectively; or (3) which are easy to manage and use, without shredder disassembly by the shredder user. A preferred embodiment of the apparatus may exhibit all three characteristics.

Application of a grinding apparatus, or grinding composition, or both, to a paper shredder in accordance with the present disclosure can be useful in maintaining good shredder performance and an extending service life, thus reducing costs. Because the shredder apparatus embodiments herein can be safe and easy to use, the embodiments can be suitable for widespread use, for example, in homes and in business offices.

Grinding composition embodiments of the present invention provide grinding compositions for sharpening a paper shredder blade, each of which compositions can include preselected concentration of a selected grinding power; a preselected concentration of a selected thickener; and a preselected concentration of a selected additive. More than one additive may be used. A suitable selected additive can be one or more of the group consisting of a selected antirust powder, a selected antiwear powder, a selected antistatic powder, or a selected antioxidation powder.

The grinding composition may be applied to grind and to keep sharp the paper shredder blade, and to remove shredder blade surface soiling including, without limitation, removing rust spots, minimizing blade stains, removing paper debris, and generally restoring the surface of the blades of the paper shredder. The grinding apparatus can be in the form of a grinding sheet, or a grinding packet. In accordance with a benefit of the present embodiments, it becomes unnecessary to open the paper shredder or to disassemble the shredder blade mechanism, to grind sharp the paper shredder blades. Both the grinding sheet and the grinding packet can be introduced directly to the paper shredder blades through the paper shredder feed opening. In certain ones of embodiments, when the shredder blade shreds a grinding packet having therein a grinding composition for sharpening a paper shredder blade, as in the usual paper shredding process, the sealed bag of the grinding packet is cut open, and the grinding composition therein contacts, grinds, and sharpens the blade. Functional additives to the grinding composition can impart other desirable characteristics onto the shredder blade. In certain others of embodiments, when the shredder blade shreds a grinding sheet for sharpening a paper shredder blade, as in the usual paper shredding process, the grinding sheet is shredded and the grinding sheet grinding composition constituents therein contact, grind, and sharpen the shredder blade. Functional additives to the grinding composition can impart other desirable characteristics onto the shredder blade.

As used herein, a grinding material is an abrasive mineral material (equally, an abrasive material, or an "abrasive"), which can have a mineral hardness of between about 7 to about 10 on the Mohs scale. Typically, very hard materials, for example, scoring between about 9 to about 10 on the Moh's scale, can include without limitation, corundum ($Al_2O_3$), or silicon carbide (SiC), but can be costlier than natural quartz, natural micron diamond, or a commercial combination of natural quartz and natural micron diamond. A grinding powder can be constituted of one or more grinding materials. Preferably, a grinding powder is a grinding material having a particle size of between about 0.1 micron to about 40 microns, although larger particle sizes, for example, up to about 70 microns, also may be used. In addition, a suitable grinding powder can have a hardness of between about 7 to about 10 on the Mohs Hardness scale ("Mohs" or "Mohs scale"). Typically, quartz grinding powder has a hardness of about 7 Mohs.

Abrasive materials used in accordance with the teachings of the present invention are hard, non-metallic materials, which can be generally categorized as a natural abrasive or as a man-made (synthetic) abrasive. Non-limiting examples of natural abrasives can include natural steel grit, natural corundum, natural diamond (diamond), natural quartz, garnet, flint, pumice, bacillariophyceae, or diatomaceous, earth, talc, gypsum, feldspar, chert, chalk, river sand, sea sand, atmosilicarenite, apatite, fluorite, calcite, or coal cinder. Because natural resources are growing limited, natural abrasives have been relegated to an alternative status relative to artificial, or synthetic, abrasives.

Non-limiting examples of artificial or synthetic abrasives can include corundum, silicon carbide (i.e., carborundum), boron carbide, synthetic diamond (diamond), cubic boron nitride, alumina, fused mullite, dense corundum, spinel, a-alumina, glass sand, ceramic vermilion, or glass beads. Non-limiting examples of corundum can include brown fused alumina, white fused alumina, black fused alumina, alumina corundum, zirconium corundum, chromium corundum, crystal corundum, or corundum ceramics. Non-limiting examples of an alumina can include white alumina, brown alumina, or pink alumina. Non-limiting examples of a silicon carbide can include black silicon carbide or green silicon carbide.

Artificial abrasives can be further divided into two segments: a super-hard abrasive or a general abrasive. Non-limiting examples of super-hard abrasives can include synthetic diamond (diamond), cubic boron nitride, or boron carbide. Similarly, non-limiting examples of general abrasives can include a corundum, an alumina, a silicon carbide, fused mullite, dense corundum, spinel, $\alpha$-alumina, glass beads, glass sand, ceramic cinnabar, or zirconia beads.

For the sake of clarity, the amounts of powder, agent, and additive will be described in terms of % w/w (by weight) concentration, of the corresponding constituent, relative to the amount of grinding composition being described. In addition, the expression "grinding apparatus" is intended to denote a grinding packet or a grinding sheet, made from a grinding composition, in accordance with the principles described herein.

A thickening agent can be used (1) to prepare a complex sodium-calcium based soap grease powder; and (2) to thicken the grease powder to promote cohesion and prevent untimely separation of the grinding powder, from one or more of the antirust powder additive, the antistatic powder additive or the antioxidation powder additive.

A suitable selected thickening agent can be one or more of the group consisting of a white oil, an animal oil, a vegetable oil, a white wax, a microcrystalline wax, a polyethylene (PE) wax, or a stearine wax. Desirably, the stearine wax can be prepared by combining stearic acid with one or more of a white wax, a microcrystalline wax, or a polyethylene wax (PE wax). The stearic acid can be made from one or both of an animal or a vegetable fat. Additional suitable thickening agents also may be, without limitation, a cosmetic white wax oil, a light mineral oil, such as "baby oil." It is desirable that thickening agents generally be fit for human contact, and may be capable of natural degradation.

Antistatic powder additive may be applied to remove static, to prevent paper debris, retained powder, or other unwanted matter, from adhering to the paper shredder blades, which may impair the shredding function of the blades. Antistatic powder additive also may be applied to reduce generation of static charges or to effectively dissipate existing static charges. The antistatic powder additive can be coated on the surface of a product or added therein. Antistatic powder additive can reduce the risk of a paper powder dust explosion, which may result from electrical sparks generated by the shredder motor, or from a static charge spark, which may accumulate on the paper shredder enclosure. A suitable antistatic powder additive can be, without limitation, a glycerol monostearate powder.

Antioxidation powder additive can be applied to inhibit the progress of oxidation and rusting of the paper shredder blade metal, and can avoid oxidative rancidity of stearine wax if used in the thickening agent. Desirably, the antioxidation powder additive is added prior to the onset of oxidative rancidity, because the oxidation cannot be substantially reduced once the oxidation reaction has occurred. A suitable antioxidation powder additive can be, without limitation, a dibutylhydroxytoluene (butylated hydroxytoluene) powder.

Antiwear powder additive can be applied to prevent abrasion and bruising of the metal surface of the paper shredder blades and to reduce vibration noise. A suitable antiwear powder additive can be, without limitation, a microcrystalline wax, or a complex sodium-calcium based soap grease powder. In general, a wear-resistant molding agent, including without limitation, microcrystalline wax or complex sodium-calcium based soap grease may be applied to adhere to the shredder blade metal surface with good adsorbability and to combine with micron quartz powder to form a rigid protection film on the shredder blades to prolong blade life. The size of micron quartz powder is normally more than about 120 mesh, and can be used for polishing. Micron quartz powder is a grinding powder that can be combined thoroughly with other grinding powders in grinding composition including a wear-resistant molding agent. In embodiments in which the grinding composition is to use between about 51% w/w to about 60% w/w of grinding powder, the total % w/w concentration of all selected grinding powders including micron quartz powder used is preferred to be about 60% w/w. More the micron quartz powder can be used, although the concentration of other selected grinding powders in such embodiments would be decreased by similar measure.

An antirust powder additive can be added to minimize the development of rust on the paper shredder blade. An antirust protection film can be coated on the paper shredder blade to prevent it from rusting, such that a stationary adhesion film is formed on the metal surface to prevent oxygen and water, especially water, from contacting the metal surface to prevent the metal from rusting.

However, common mineral oil or vegetable oil alone tends to exhibit a weak adsorbability to the shredder blade metal surface. Typically, free radical energy on the metal surface can be in a range of between about 0.1 Newton/meter (N/m)) to about 1 N/m. Water has a surface tension of $8 \times 10^{-4}$ N/cm and the surface tension of a hydrocarbon, such as common mineral oil or vegetable oil, tends to range from about $2 \times 10^{-4}$ N/cm to about $3 \times 10^{-4}$ N/cm. Thus, common mineral oil or vegetable oil may form an unsuitable non-stationary oil film, because of the tendency of these oils to absorb and dissolve part of water and oxygen to which they may be exposed, allowing the oil film to be easily permeated. Although these common unmodified oils, alone, may play a weak role as an antirust film, their respective antirust properties are significantly improved by the addition of an antirust power additive. A suitable selected antirust powder additive can be, without limitation, a stearate powder, such as aluminum distearate.

FIG. 1 is a cross-sectional front view of grinding sheet 100 (also called a grinding page), which may be formed of a selected grinding composition. In general, a grinding composition may be viewed as grinding powder 2 intermixed in functional matrix 3. Functional matrix 3 can include at least one thickening agent, and at least one selected additive. Functional matrix 3 can be disposed in a wax-like form, which may facilitate economic manufacturing.

Figure 2:
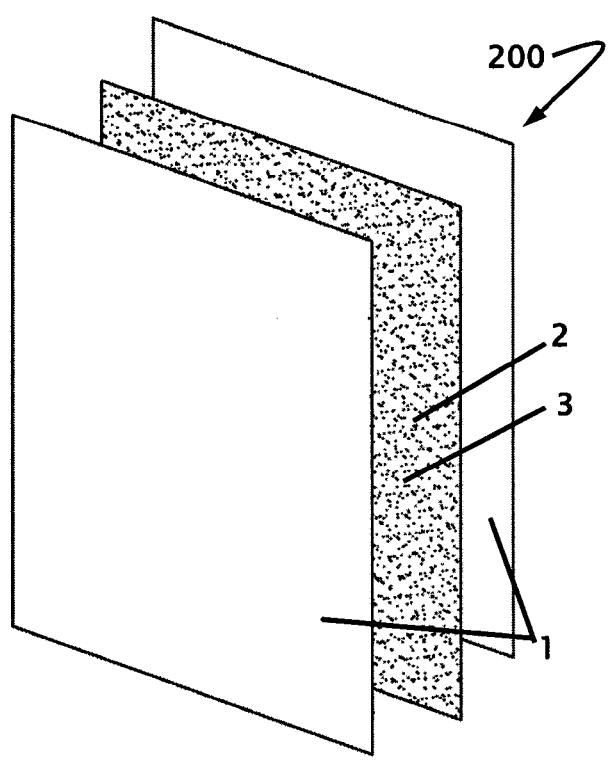
FIG. 2 is a plan cross-section view of a grinding apparatus for sharpening a paper shredder blade, in accordance with the teachings of the present invention.

FIG. 2 is an exploded perspective view of grinding sheet 200, which may be similar to grinding sheet 100. Grinding sheet 100 can be formed such that plastic sheet 1 may enwraps functional matrix 3, for example, as shown in FIG. 2. Plastic sheet 1 may be provided from a continuous roll of plastic sheet, from a continuous roll of a plastic sleeve, or from individual plastic sheeting containers. Furthermore, plastic sheet 1 may be fabricated from two or more layers, which may be sealed or laminated together. Moreover, grinding packet 200 may be formed by laminating a plastic sheet 1 on opposing surfaces of formed grinding composition 2, 3.

The size of the grinding sheet or grinding page may be formed as having a single page width as measured across a longitudinal aspect of a feed opening of a paper shredder. Grinding sheet length may be, for example, that of a standard Letter or A4 paper sheet, or may be formed to be longer or shorter, as found to be efficacious for a type of paper shredder. Alternatively, a width of a grinding sheet relative to a longitudinal aspect of a feed opening may be formed to be wider or narrower than the respective shredder feed opening.

In embodiments of a grinder sheet in accordance with the foregoing method, one constituent grinding composition material can be a thickening agent including stearine wax. Those of ordinary skill in the art would readily ascertain the physical parameters involved in producing a grinding sheet having desired characteristics, in view of the above teachings.

Some embodiments of a grinding composition according to the teachings above may be constituted of between about 51% w/w to about 65% w/w of a selected grinding powder; between about 5% w/w to about 35% w/w of a selected thickening agent; and between about 3% w/w to about 30% w/w of a selected additive.

In certain embodiments of a grinding composition, it is desirable to provide: a grinding powder in the concentration of about 55% w/w, an antirust powder additive in the concentration of about 5% w/w, an antiwear powder additive in the concentration of about 2% w/w, a thickening agent in the concentration of about 35% w/w, an antistatic powder additive in the concentration of about 2% w/w, and an antioxidation powder additive in the concentration of about 1% w/w. The thickening agent may be constituted of a white oil or a vegetable oil, or both.

In alternative embodiments of a grinding composition, the concentration of a grinding powder may be about 57% w/w, the concentration of a antirust powder may be about 5% w/w, the concentration of a thickening agent may be about 35% w/w, the concentration of the antistatic powder may be about 2% w/w and the concentration of the antioxidation powder may be about 1% w/w. In these alternative embodiments, the thickening agent can be stearine wax.

Figure 3A:
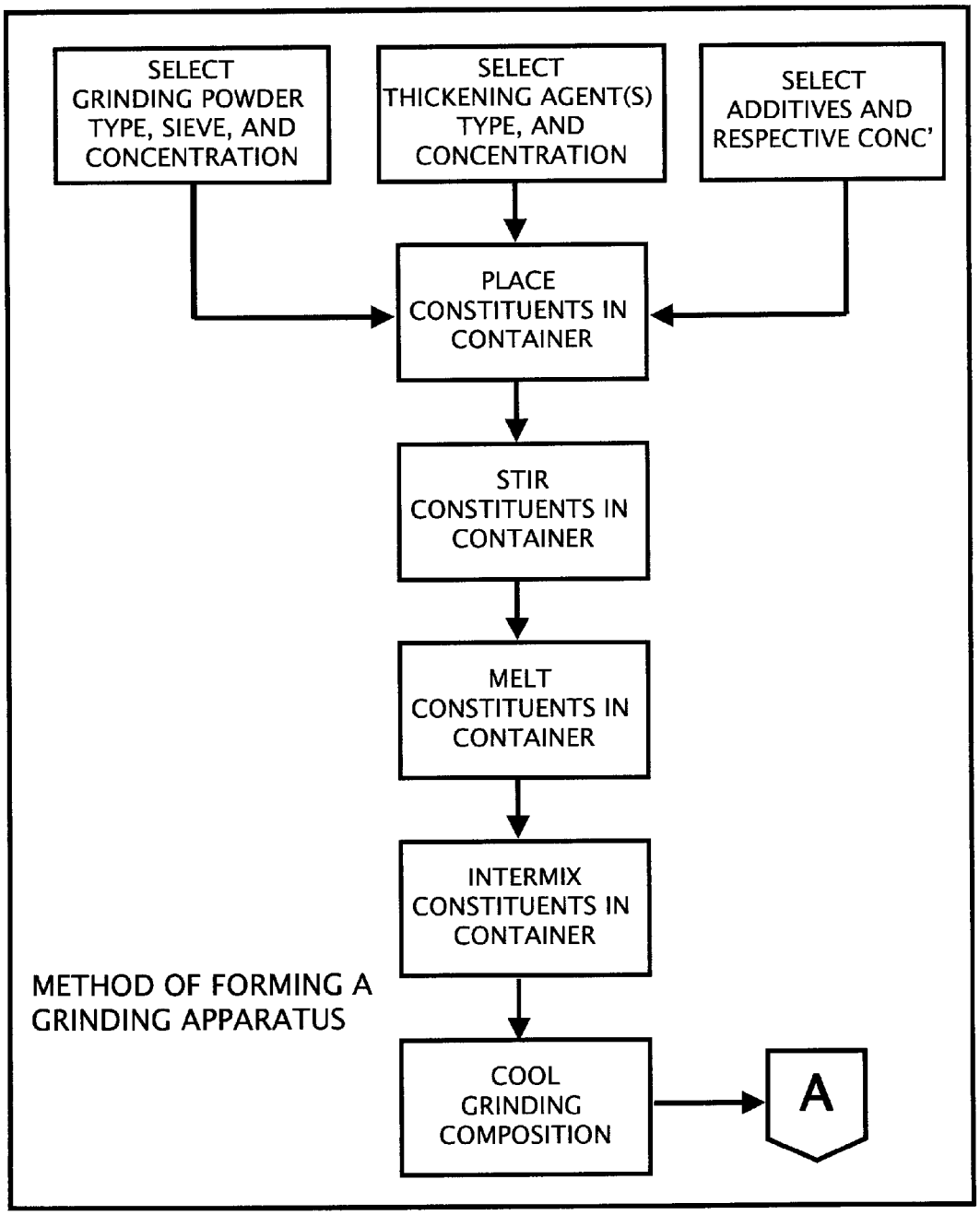
FIG. 3A is a flow chart illustrating a method for preparing a grinding apparatus for sharpening a paper shredder blade, in accordance with the teachings of the present invention.
Figure 3B:
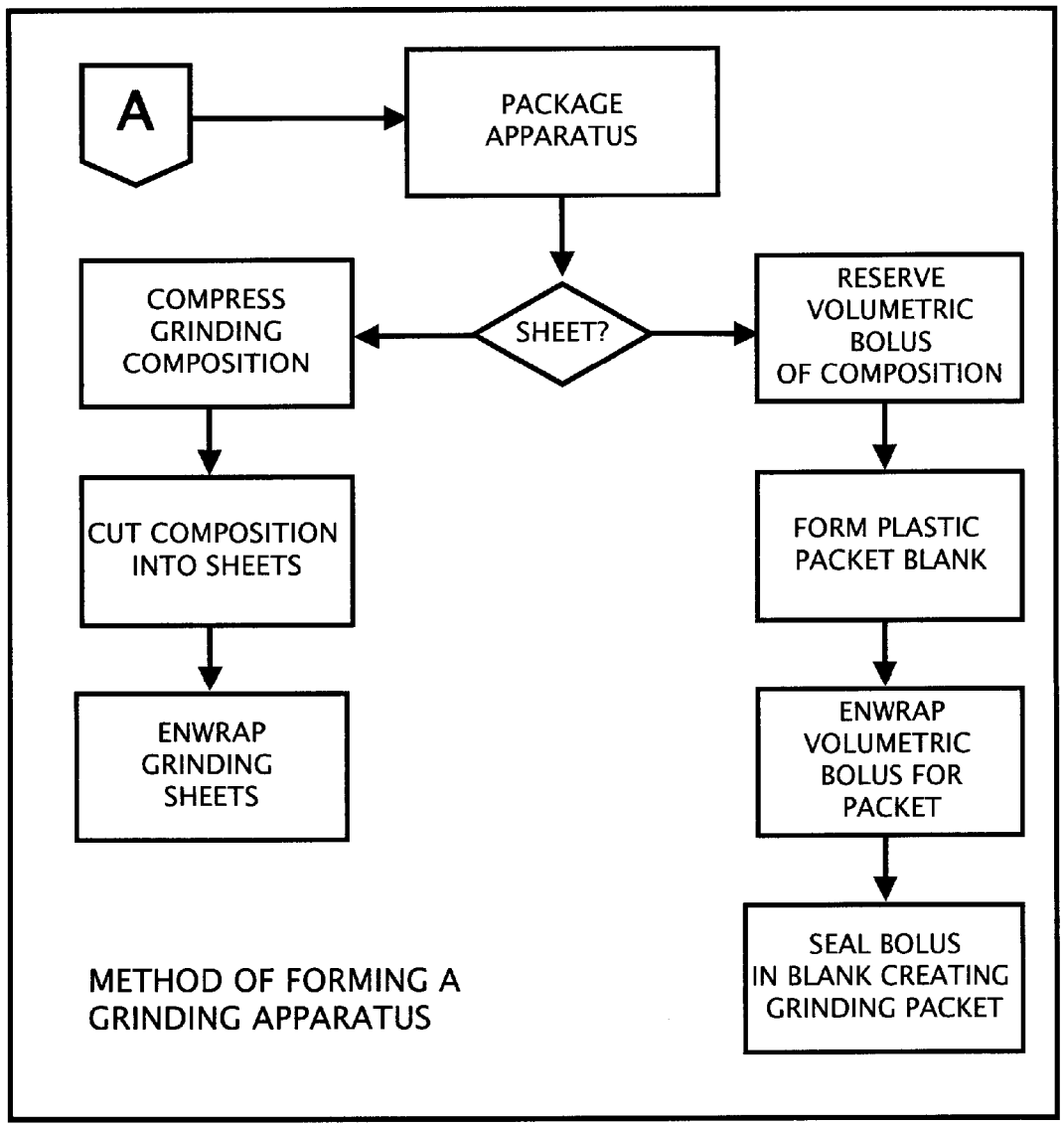
FIG. 3B is a flow chart supplementing the flow chart in FIG. 3A illustrating a method for packaging a grinding apparatus for sharpening a paper shredder blade, in accordance with the teachings of the present invention.

A present method 300 for forming grinding sheet 100, 200 is illustrated in FIGS. 3A-3B, and can include: selecting (310) the constituent materials for a grinding composition of a grinding sheet for sharpening a paper shredder blade; stirring (320) the constituent grinding composition materials 2, 3; heating (330) the constituent grinding composition materials to effect melting; mixing (340) the constituent grinding composition materials, while melted to achieve a preselected intermixing thereof; cooling (350) the intermixed grinding composition materials; and enwrapping (360) the cooled intermixed grinding composition constituents to form one of a grinding sheet or a grinding packet. In some embodiments, such as those in which a grinding sheet is formed, the method also may include one or both of compressing (370) the cooled intermixed grinding composition constituents, for example to form a flat grinding composition sheet, or cutting to size (380) the grinding composition sheets to the selected length and selected width. Of course, one of ordinary skill in the art would realize that extremely large sheets could be prepared, cooled, and cut into grinding sheets of a desired, predetermined size.

In certain other embodiments, enwrapping (360) for grinding apparatus for sharpening a paper shredder blade can include pre-measuring (365) a volumetric bolus of grinding composition into the shape of a packet. As used herein, the term "volumetric bolus" describes a mass of material having a known volume. Process 300 may continue by forming (375) a grinding packet blank capable of receiving the volumetric bolus from at least one sheet of plastic film. Formation of the grinding packet can continue by enwrapping (385) the volumetric bolus of grinding composition within the plastic bag or plastic film, and by sealing (395) the volumetric bolus of grinding composition following enwrapping. In certain embodiments, a grinding packet can be a plastic sealed bag. In selected embodiments, a grinding packet can be a polypropylene sealed bag. In certain selected embodiment in which a plastic film is used, the plastic film can be a polypropylene plastic film. Sealing (395) may be effected, for example, by sealing at least a portion of the respective periphery of two opposite sidewalls of plastic sheeting containing therein the volumetric bolus of grinding composition. Also, some embodiments of a grinding packet may be formed from a sealable plastic bag. Moreover, a grinding sheet may be disposed in a sealed plastic bag, a sealable plastic bag, or a non-sealed plastic bag.

A present method for forming a grinding packet for sharpening a paper shredder blade, such as method 300 in FIGS. 3A-3B can be performed by an automatic filling machine for making bags, such as, without limitation, an automatic forming, filling, and sealing (FFS) machine. The FFS machine may have a feed channel for pre-measuring (365) a volumetric bolus of a grinding composition to be deposited on a sheet portion intended to become a grinding packet. Other embodiments of method 300 for forming a grinding packet can include: shift positioning (362) a roll of a plastic film on the FFS machine; feeding (364) into a feed channel of the FFS machine a selected grinding composition for sharpening a paper shredder blade; forming (375) a grinding packet blank having the predetermined width and predetermined length; depositing (384) a volumetric bolus of the selected grinding composition into the grinding packet blank; enwrapping (385) the volumetric bolus with the grinding packet blank; sealing (395) at least a portion of a periphery of grinding packet blank containing the volumetric bolus of the selected grinding composition held therein; and finishing (398) the filled packet blank to form a sealed grinding packet.

In certain ones of the embodiments of grinding apparatus, the polypropylene plastic film, or bag, can be made from oriented polypropylene (OPP), cast polypropylene (CPP), or, desirably, from a combination of OPP and CPP films (e.g., OPP.CPP film). OPP.CPP film, whose main element is polypropylene plastic, is recyclable, can be completely combusted, does not generate a toxic gas during incineration, and does not degrade the use life of an incinerator, reducing both secondary pollution and higher recycling costs.

At least one character, a picture, or a symbol characters and/or pictures can be imposed on the plastic film in advance of forming the grinding packet using, without limitation, a single-color printing technique or a chromatography technique.

In certain embodiments of the method for forming a grinding packet for sharpening a paper shredder blade, preparation of at least a portion of the grinding composition can be performed proximate to the FFS machine approximately simultaneously with the feeding into the feed channel, or the grinding composition may be pre-mixed and, in some cases, may be pre-measured as a volumetric bolus prior to feeding. In general, the required filling concentration of the grinding composition for sharpening a paper shredder blade may be adjusted during a grinding packet forming process, as may the width and length of the finished plastic package. Those of ordinary skill in the art would realize that horizontal and vertical types of FFS machines can be used to form the grinding packets herein, as well as other types of packaging machinery.

Two Example Processes, namely Example Process I and Example Process II, are provided below to further illustrate the principles of producing a grinding composition, in accordance with present teachings.

EXAMPLE PROCESS I

The example first process for preparing a grinding packet for sharpening a paper shredder blade can be performed in a working environment having a room temperature between about 20° C. and about 30° C., and having a relative humidity of between about 60% and about 70%.

Example Process I can include making a complex sodium-calcium based soap grease using an oil mixture, having about 20% grease in the total oil amount, and an alkaline substance, to form a solution in a reaction container. The grease can be composed of animal grease, vegetable grease, or a combination of animal grease and vegetable grease. The alkaline substance can be, without limitation, one or more of sodium hydroxide, calcium hydroxide, or calcium acetate. Mixing the oil mixture with the alkaline substance can cause hydrolysis of the fats in the grease and oils to occur, producing glycerol and a soap. This hydrolysis process commonly known as a saponification reaction. A saponification reaction is a slow, exothermic chemical reaction. To optimize and accelerate the saponification reaction, a relatively high temperature, such as between about 75° C. to about 85° C. may be maintained in the reaction container during the chemical reaction process, and the solution can be stirred substantially continuously, for example, at between about 1,000 revolutions/min to about 1200 r/min, to increase the number of molecular collisions between constituents of the solution in the reaction container.

Referenced saponification values, which are well-known in the art, and samples of which are shown in TABLE 1, can be helpful when calculating the amount of sodium hydroxide required by a grease saponification reaction.

TABLE 1

| Types of Oil | Saponification value (sodium hydroxide/NaOH) | Hardness Value (INS Value) |
|---|---|---|
| Olive Oil | 0.134 | 109 |
| Coconut | 0.190 | 258 |
| Palm | 0.141 | 145 |
| Rice Bran | 0.128 | 70 |

Chemical equation of Saponification Reaction
A chemical formula for triglyceride is:

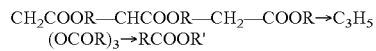

$$CH_2COOR\text{---}CHCOOR\text{---}CH_2\text{---}COOR \rightarrow C_3H_5(OCOR)_3 \rightarrow RCOOR'$$

A triglyceride can be composed of three molecules of a fatty acid (R—COOH) and one molecule of glycerol ($C_3H_5$(OH)). Therefore, an equation of the saponification reaction can be:

$$CH_2COOR\text{---}CHCOOR\text{---}CH_2\text{---}COOR + 3\,NaOH \Rightarrow$$

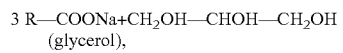

$$3\,R\text{---}COONa + CH_2OH\text{---}CHOH\text{---}CH_2OH \text{ (glycerol)},$$

wherein

3 R—COONa is a soap base of sodium aliphatate; and
R— can be one of:

- $C_{17}H_{33}$-: 8-heptadecenyl, in which R—COOH is oleic acid;
- $C_{15}H_{33}$-: n-pentadecyl, in which R—COOH is palmitic acid; and
- $C_{17}H_{35}$-: heptadecyl, in which R—COOH is stearic acid;

In general, grease is a monounsaturated fatty acid, and can be obtained, for example, by hydrolyzing oil. Palmitic acid and stearic acid are both saturated fatty acids, and each may be obtained by hydrolyzing fat.

Application of Saponification Reactant to Grinding Composition

Complex sodium-calcium based soap grease, like a sponge, can absorb a large amount of grinding powder 2 and remain in a semi-solid state. Sodium-calcium based soap grease exhibits desirable water and temperature tolerance, and good antiwear properties. The dropping point of a grease is the temperature at which the grease begins to liquefy and becomes fluid enough to drip. The dropping point of the complex sodium-calcium based soap grease is at about 150° C.; however, it may be used in a temperature range of between about 100° C. to about 130° C. By itself, the complex sodium-calcium based soap grease displays strong adsorbability to metal, and can be combined with a micron quartz powder to form an antiwear film on the shredder blade metal.

In general, there can be a positive correlation between the concentration of the soap grease in the grinding composition and its thickness. Typically, by increasing the concentration of soap grease, the grinding composition tends to exhibit increasing thickness. Conversely, by decreasing the concentration of soap grease, the grinding composition tends to exhibit decreasing thickness. Thus, one technique to adjust the thickness of a particular grinding composition is to adjust the concentration of complex sodium-calcium based soap grease included in the grinding composition.

Use of the aforementioned optimized parameters may shorten saponification time to 45 minutes, after which substantially continuous stirring may be performed until the soap cools, for example, to room temperature. Of course, a suitable cooling system may be used to accelerate cooling. One or more thickening additive constituents may be added to the complex sodium-calcium based soap grease. Suitable thickening additive constituents may include one or more of a white oil, an animal oil, or a vegetable oil. Grinding powder 2 may be intermixed until substantially evenly diffused in the complex sodium-calcium based soap grease mixture, to obtain a gel in a semi-solid state.

Mixing may be performed using a two-channel mixer, having an A-channel and a B-channel. Grinding powder 2 can be sieved to reduce the likelihood of the powder deliquescing from contact with ambient moisture, which may lead to undesirable grinding powder agglomeration. In certain embodiments, complex sodium-calcium based soap grease may be placed in A-channel and be substantially continuously stirred by a stirring machine at a rate of between about 100 r/min. to about 1200 r/min. A substantial portion of one or more thickening agents, for example 80%, may be held in B-channel, while a selected additive 3 is be diffused in B channel. The grease mixture in B-channel may be fast-stirred by the stirring machine at a rate of between about 3000 r/min and about 4000 r/min to promote substantially complete dissolution of the selected additive into the B-channel mixture. The grease mixture in B-channel may be added slowly into A-channel and may be substantially continuously stirred until the grease mixture is completely dissolved into a paste.

A non-limiting example of the slow adding of B-channel constituent into A-channel constituent can be adding B-channel constituent at a speed of about 10% of the total oil amount per minute into A-channel constituent. Thereafter, grinding powder 2 may be dispersedly added, for example, using substantially continuous stirring, to produce a semi-solid gel. The semi-solid gel in A-channel may be spirally propelled into a feed channel of an FFS machine for making bags, such that finished grinding packets are prepared in accordance with the teachings herein.

EXAMPLE PROCESS II

A grinding sheet for sharpening a paper shredder blade can be prepared by a second example process, in which non-limiting example of a suitable working environment can be characterized, at least in part, by having an ambient temperature between about 20° C. to about 30° C. Also, relative humidity in the working environment can be between about 60% to about 70%.

Stearic acid may be made from an animal fat, or by a vegetable fat, or by a suitable combination of animal fat and vegetable fat. The stearic acid may be placed in a single-channel stirring bucket capable bi-directional gear shifted stirring bucket. The stirring bucket may be maintained at a temperature of about 200° C., using, for example, an adjustable temperature cycling kerosene heater. One or more of a white wax, a microcrystalline wax, or a PE wax may be mixed into the channel. After wax is substantially completely dissolved in the channel, the bucket temperature may be lowered to about 150° C. and may be stirred at a speed of between about 1000 r/min. to about 1200 r/min. A selected additive may be added to the stirring bucket mixture and stirred until dissolved. Previously-sieved grinding powder 2 may be added to the stirring machine bucket, with the stirrer being adjusted to stir the mixture at a speed of between about 2000 r/min. to about 2500) r/min.

Approximately 15 minutes later, the stirring pot mixture may be maintained at a temperature of about 120° C., with the stirring machine being adjusted to stir the mixture at a speed of between about 1000 r/min. to about 1200 r/min. The mixture may be sent thereafter to a cooling system, for example, via a heat-insulated, compressed air transmission line. The cooling system, if used, may employ cooling water cycling, in which the grinding composition mixture may be deposited on a grooved metal transfer sheet having a surface covered with PTFE. After the mixture is cooled, it may be compressed to a preselected thickness, and may be cut into sheets having a selected width and a selected length. A cutter employing a gear shift motor transmission set may be used to cut the grinding composition into wax-like sheets. The solid wax-like grinding composition sheets may be sent to a automatic planing machine to finish the form of the grinding sheet, for example, to a preselected thickness. One or more formed grinding composition sheets may be packaged into a non-sealed bag, or an unsealed bag which may be sealable. Grinding composition sheets may be "stacked" in that the more than one layer of grinding composition sheet may be laminated together to achieve, for example, a preselected thickness.

In the above Example Processes I and Example Process II, grinding apparatus 100, 200 (sheet or packet) may be made (400) by: shift positioning (410) a roll of laminated plastic film on an automatic filling and bagging machine; feeding (420) a grinding composition for sharpening a paper shredder blade into a feed channel of the automatic filling and bagging machine; reserving (430) from the feed channel a preselected bolus volume of grinding composition; preparing (440) a receiver from the roll of laminated plastic for the bolus volume having a preselected width and a preselected length; dispensing (450) the bolus volume of the grinding composition into the receiver, and enwrapping (460) the bolus volume by sealing the bolus volume in the receiver such that one of a grinding packet or a grinding sheet is formed.

A grinding sheet can be packaged in a manner similar to the aforementioned process to produce a sealed package. Alternatively, a grinding sheet may be packed in a non-sealed package, or an unsealed but sealable package. The grinding sheets can be separated from each other with the environment friendly materials such as common paper, release paper, plastic film paper, powders, etc.

Each of Example Formulations 1-5 of grinding composition may be used to make grinding apparatus 200, although each of the Example Formulations is meant to be illustrative and non-limiting.

EXAMPLE FORMULATION 1

Example Formulation 1 may be formed by combining the constituents described in TABLE 2, using Example Process II, above.

TABLE 2

| Grinding Composition Example Formulation I | | |
|---|---|---|
| Constituent | Material | Am't (% w/w) Approx. |
| Grinding Powder | grinding powder of natural diamond | 55% w/w |
| Thickening Agent | white oil | 35% w/w |
| Antirust Powder | aluminum distearate | 5% w/w |
| Antiwear Powder | complex sodium-calcium based grease soap | 2% w/w |
| Antistatic Powder | glycerol monostearate | 2% w/w |
| Antioxidation Powder | dibutylated hydroxytoluene | 1% w/w |

EXAMPLE FORMULATION 2

Example Formulation 2 may be formed by combining the constituents described in TABLE 3, using Example Process I, above.

TABLE 3

Grinding Composition Example Formulation 2

| Constituent | Material | Am't (% w/w) Approx. |
|---|---|---|
| Grinding Powder | grinding powder of natural diamond | 57% w/w |
| Thickening Agent | stearine wax | 35% w/w |
| Antirust Powder | aluminium distearate | 5% w/w |
| Antiwear Powder | complex sodium-calcium based grease soap | 2% w/w |
| Antistatic Powder | glycerol monostearate | 2% w/w |
| Antioxidation Powder | dibutylated hydroxytoluene | 1% w/w |

EXAMPLE FORMULATION 3

Example Formulation 3 may be formed by combining the constituents described in TABLE 4, using Example Process II, above.

TABLE 4

Grinding Composition Example Formulation 3

| Constituent | Material | Am't (% w/w) Approx. |
|---|---|---|
| Grinding Powder | grinding powder of natural micron quartz | 51% w/w |
| Thickening Agent | vegetable oil | 20% w/w |
| Antirust Powder | aluminum distearate | 15% w/w |
| Antiwear Powder | complex sodium-calcium based grease soap | 6% w/w |
| Antistatic Powder | glycerol monostearate | 6% w/w |
| Antioxidation Powder | dibutylated hydroxytoluene | 2% w/w |

EXAMPLE FORMULATION 4

Example Formulation 4 may be formed by combining the constituents described in TABLE 5, using Example Process II, above.

TABLE 5

Grinding Composition Example Formulation 4

| Constituent | Material | Am't (% w/w) Approx. |
|---|---|---|
| Grinding Powder | grinding powder of natural micron quartz | 65% w/w |
| Thickening Agent | vegetable oil | 5% w/w |
| Antirust Powder | aluminium distearate | 15% w/w |
| Antiwear Powder | complex sodium-calcium based grease soap | 6% w/w |
| Antistatic Powder | glycerol monostearate | 6% w/w |
| Antioxidation Powder | dibutylated hydroxytoluene | 3% w/w |

EXAMPLE FORMULATION 5

Example Formulation 5 may be formed by combining the constituents described in TABLE 6, using Example Process I, above.

TABLE 5

Grinding Composition Example Formulation 4

| Constituent | Material | Am't (% w/w) Approx. |
|---|---|---|
| Grinding Powder | grinding powder of natural micron quartz | 64% w/w |
| Thickening Agent | stearine wax | 32% w/w |
| Antirust Powder | aluminium distearate | 1% w/w |
| Antiwear Powder | microcrystalline wax in stearine wax | 1% w/w |
| Antistatic Powder | glycerol monostearate | 1% w/w |
| Antioxidation Powder | dibutylated hydroxytoluene | 1% w/w |

A grinding packet for sharpening a paper shredder blade, according to the teachings herein, is formed to be easy to use, and can be directly inserted into the paper feed opening of a paper shredder. Similar to the shredding process for paper, when the rotating blade of the paper shredder cuts the grinding packet, the sealed bag is cut open. When opened, the grinding packet contents are released, at least in part, onto the paper shredder blades. According to the pressure principle, the grinding powder released from the sealed bag grinds at both sides of a rotating shredder blade, thereby sharpening it. Further, an antirust protection coating film is formed by a functional antirust additive which may be included in the grinding composition. Similarly, an antioxidation additive or antistatic additive, or both, which may be included in the grinding composition, can enhance the respective antioxidation and antistatic properties of the paper shredder blade. Once through the paper shredder blades, the shredded grinding packet can be disposed in the shredder waste bin. As will be understood by an ordinary artisan, functional additives included within the grinding packet also can provide the function of paper shredder maintenance apart from grinding and sharpening the paper shredder blade.

In a similar way, a grinding sheet for sharpening a paper shredder blade, according to the teachings herein, may be employed simply by inserting at least one grinding sheet into a paper shredder feed opening, as one would feed a sheet of ordinary paper to the shredder. As the blades of the shredder cut apart the grinding sheet, the grinding constituent can grind and sharpen a paper shredder blade, while functional additives perform maintenance functions on the shredder blade mechanism.

The embodiments of the present invention disclosed herein are intended to be illustrative only, and are not intended to limit the scope of the invention. It should be understood by those skilled in the art that various modifications and adaptations of the prevent invention as well as alternative embodiments of the prevent invention may be contemplated or foreseeable. It is to be understood that the present invention is not limited to the sole embodiments described above, but encompasses any and all embodiments within the scope of the following claims.

The invention claimed is:

1. A method for preparing a grinding composition, comprising:
   selecting a selected grinding powder constituent in a concentration of between about 51% w/w to about 65% w/w;

selecting a selected thickening agent constituent in a concentration of between about 5% w/w to about 35% w/w wherein the selected thickening agent includes a stearine wax;

selecting a selected additive constituent in a concentration of between about 3% w/w to about 30% w/w;

stirring the constituents;

melting the constituents;

intermixing the constituents until homogenized into a grinding composition;

cooling the grinding composition; and forming the grinding composition into preselected form.

2. The method of claim 1, further comprising:

forming the grinding composition includes compressing the grinding composition into a grinding sheet, wherein the grinding sheet is capable of sharpening a blade of a paper shredder.

3. The method of claim 1, further comprising:

forming the grinding composition includes depositing the grinding composition into a plastic bag; and sealing the plastic bag to form a grinding packet, wherein the grinding packet is capable of sharpening a blade of a paper shredder.

\* \* \* \* \*